June 12, 1934.  R. T. STOCK  1,962,972
VARIABLE SPEED GEAR
Filed June 20, 1932  2 Sheets-Sheet 1
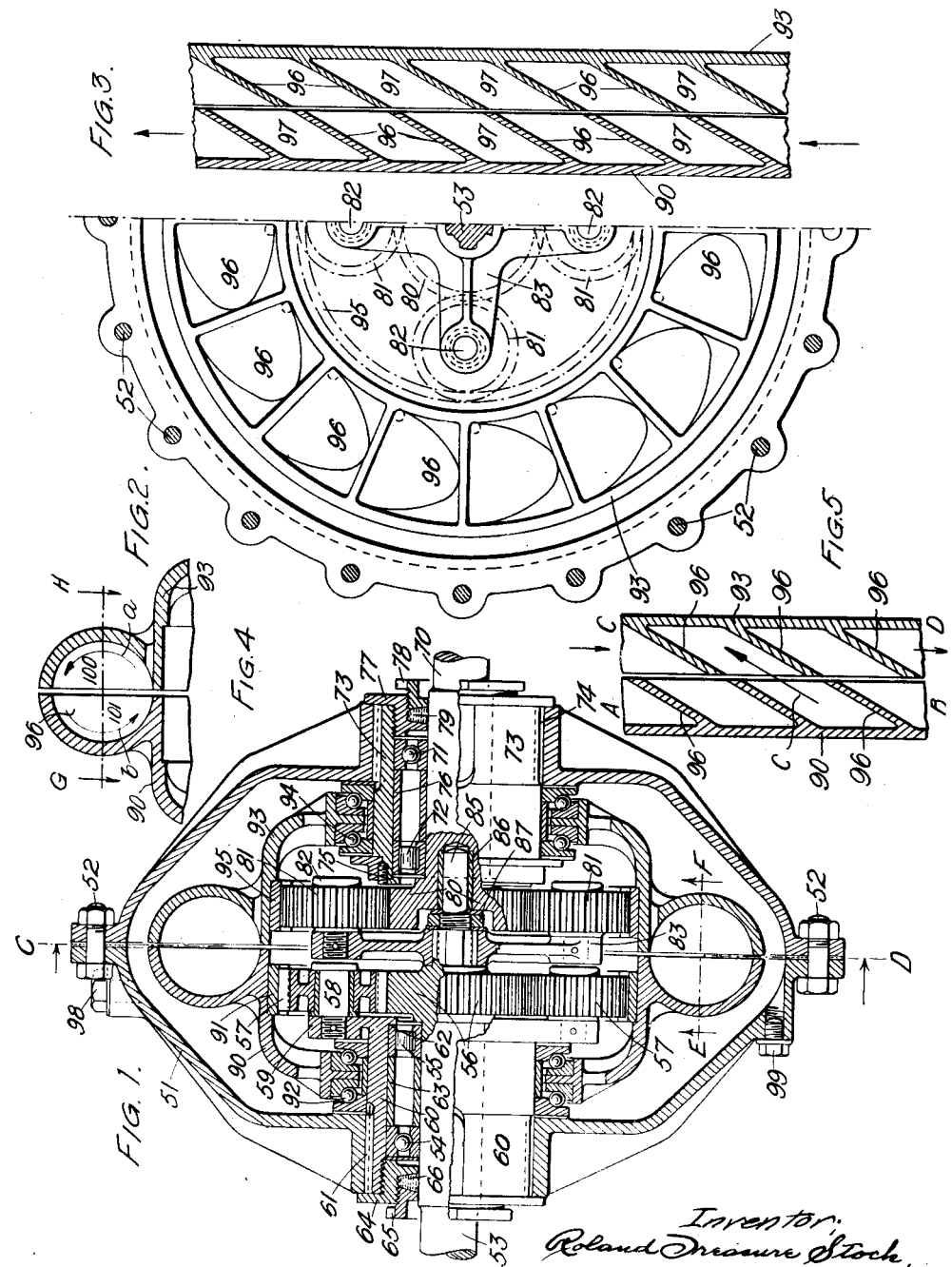

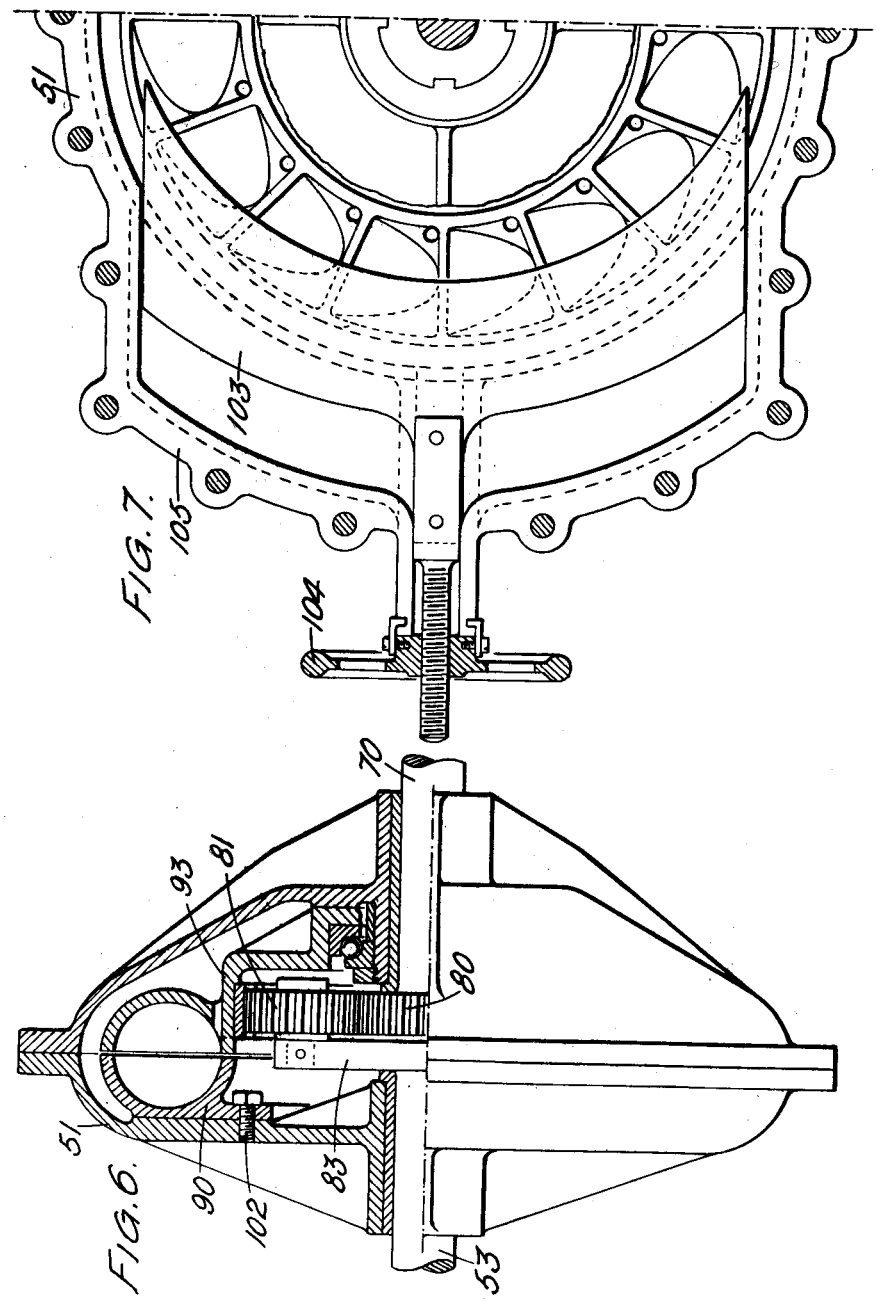

Patented June 12, 1934

1,962,972

UNITED STATES PATENT OFFICE 1,962,972

VARIABLE SPEED GEAR

Roland Treasure Stock, Hendon, England

Application June 20, 1932, Serial No. 618,321
In Great Britain June 29, 1931

12 Claims. (Cl. 74—293)

This invention relates to variable speed gearing for the transmission of power and has for its object to provide simple and effective means for varying the speed ratio between the driving and driven members in a power transmission system.

The present invention moreover relates to variable speed gearing of the type comprising a driving member, a driven member, an intermediate or reaction member and means for applying a controlling action or force to said intermediate member for the purpose of varying the speed ratio between the driving and driven members. These three members are preferably the three elements of the well-known epicyclic or differential train.

A principal object of this invention is to provide variable speed gearing of the type described, wherein the intermediate member carries vanes or the like adapted to be engaged by liquid projected or caused to move in a direction opposed to that in which the vanes are moved by the combined action of the engine and the load reaction, the hydraulic force exerted by the projected liquid serving as a control which causes the driven member to be driven at a speed automatically suited to the load.

A further object of the invention is to provide variable speed gearing of the type described, wherein the intermediate member carries vanes or the like adapted to operate in conjunction with a member carrying a series of inclined vanes, the arrangement being such that said inclined vanes are adapted to project liquid on to the intermediate member vanes in a direction opposed to that in which the intermediate member is moved by the combined action of the engine, and the load reaction for the purpose specified.

The invention may be carried into practical effect in a variety of ways, for example, I may employ a simple epicyclic gear having any convenient number of planet wheels provided whereby they are free to rotate upon spindles secured to arms mounted concentrically with a sun wheel, the said planet wheels being in constant mesh therewith and with an internally geared wheel which may also be mounted concentric with the sun wheel.

The driving force may conveniently be applied to the planet wheels, the sun wheel, or the internally geared wheel, as may be found convenient, and any one of the remaining elements constituting the intermediate or reaction member may be subject to the hydraulic control.

By this means the ratio of speeds between the driving and driven wheels will vary according to the speed and/or direction of the intermediate wheel or member.

Typical embodiments of the invention are described in the following specification and illustrated in the accompanying drawings, in which:

Fig. 1 is a sectional elevation of my variable speed gearing;

Fig. 2 is a section on line C—D of Fig. 1, looking in the direction of the arrows;

Fig. 3 is a view showing part of the development of a section taken on the line E—F of Fig. 1;

Figs. 4 and 5 are views illustrating the hydraulic action;

Fig. 6 is a part sectional elevation of a modification of the gearing illustrated in Fig. 1, and Fig. 7 is a view similar to Fig. 2 showing another modification.

In the embodiment of the invention illustrated the reaction of the intermediate member to the torque of the driving member is controlled by the use of a hydraulic coupling. One element of the hydraulic coupling is carried by the intermediate member whilst the other element is carried on a positionally fixed support and may either be stationary or rotatably mounted on said support and independently driven by suitable means.

The construction of the hydraulic coupling may be of any suitable known type. An example of this type mechanism is described in British specification No. 1,163 of 1877.

The gear comprises a two-part gear casing 51 bolted together by bolts 52 and enclosing the gear mechanism which is operated submerged or "drowned" in liquid, preferably lubricating oil. The driving shaft 53 is journaled in the left half of the casing in ball and roller bearings 54 and 55 respectively, and carries a driving wheel 56, which engages with four idle pinions 57 mounted on pins 58 protruding from a fixed spider 59. The latter is formed with an extension 60 which is splined, as at 61, into casing 51 so as to be incapable of rotation. The inner surface of the extension 60 serves as a housing for the ball and roller bearings 54 and 55, which are held in position by the shoulder 62, distance piece 63, and collar 64, screwed into the extension 60. A gland 65 and packing 66 ensure a fluid tight joint between the shaft and the casing. In like manner the driven shaft 70 is journaled in ball and roller bearings 71 and 72 within a housing 73 splined, as at 74, to the casing 51, the bearings being held in position by means of the shoulder 75, distance piece 76, and collar 77, screwed into the housing 73. A gland 78 and packing 79 ensure a fluid tight connection between the driven shaft and the casing.

The driven shaft carries a sun wheel 80 in geared relationship with four planetary pinions 81 carried by pins 82 on a spider 83. The spider 83 is mounted fast on the driving shaft 53, which has a part 85, of reduced diameter, which is spigoted into a bush 86 recessed into the driven shaft 70. A nut 87 secures the spider 83 in position on the driving shaft.

A primary vane wheel 90, furnished with an internally toothed annulus 91, is mounted in ball bearings 92, carried by the extension 60. In like manner, a secondary vane wheel 93, is mounted in ball bearings 94 on the housing 73 and is furnished with an internally toothed annulus 95 constituting the intermediate member of the epicyclic train.

The annuli 91 and 95 engage respectively with the pinions 57 and 81. The primary and secondary vane wheels 90 and 93 are provided with a plurality of vanes 96 located on their periphery. The vanes 96 are sloped as shown in Fig. 3 in the development taken along the line E—F of Fig. 1. The construction is such as to constitute a number of cells 97, the mouths of which face one another. Plugs 98 and 99 serve respectively as an inlet and outlet to the casing, whereby the casing may be filled with, or emptied of, liquid.

In operation, assuming the driving shaft 53 is rotated, as viewed from the left, in a clockwise direction, the idle pinions 57 will be rotated in an anticlockwise direction, thus imparting a similar rotation to the primary vane wheel 90, that is upwards in Fig. 3. The speed of rotation of such primary vane wheel will be directly proportional to the speed of the driving shaft. The planetary pinions 81 will travel round the driven sun wheel 80 in a clockwise direction, it being assumed that the load on the driven shaft causes the sun wheel 80 to resist rotation. In the course of their travelling round the sun wheel the planetary pinions 81 will, in themselves, be rotated about their own respective pivots in a clockwise direction, with the result that a clockwise rotation will be imparted to the secondary vane wheel 93. The whole unit is drowned in a liquid.

The combined action of the engine and the load reaction on the secondary vane wheel 93 tends to make that wheel move downwards in Fig. 3, encountering the upward flow of liquid from the vane wheel 90 forming the automatic hydraulic control between the primary and secondary vane wheels. The resulting direction and speed of rotation of the vane wheel 93 is dependent upon these opposite actions. The speed of the sun wheel 80 is thus caused to depend on the load and consequently an automatic variable gear ratio is obtained between the driving and driven members.

It is not necessary for the invention that the vane wheel 90 be moving in the opposite direction to that in which the vane wheel 93 tends to move. The vane wheel 90 may be fixed or even moving relatively slowly in the same direction as the vane wheel 93. All that is necessary according to the invention is that the vane wheel 90 should project liquid in a direction opposed to that of the advance of the vane wheel 93 under the combined action of the driving force and of the load.

As shown in Fig. 6, the vane wheel 90 is fixed to the casing 51 by bolts 102, and, except for the omission of the several elements shown in Fig. 1 for driving the vane wheel 90, the remaining parts may be substantially as shown in Fig. 1.

An analysis of the hydraulic action is described with reference to Figs. 4 and 5, in which A—B represents the section of a fixed primary vane wheel or element, and C—D the section of the intermediate vane wheel moving in the direction indicated by the arrows. The liquid in the moving cells 100 of the wheel 93 is projected by centrifual force in the direction arrow $a$ (Fig. 4). In consequence, in the fixed cells 101, it is moving inwards in the direction of the arrow $b$. The liquid is thus delivered from the cells of the fixed vane wheel 90 in the direction of the arrow $c$ (Fig. 5), that is in the direction opposed to that of the advance of the vane wheel 93.

Any other known type of hydraulic coupling may be employed to effect the same purpose.

The forces acting in the coupling may be regulated in known manner, by sluices 103 (Fig. 7) sliding between the two sets of vanes, the position of the sluices being adjustable, as by the hand-wheel 104, the sluices working in an enlargement 105 of the casing 51.

I claim:

1. In variable speed gearing, the combination with a driving member, a driven member and an intermediate member, means supporting said intermediate member and said driven member for rotation by said driving member at relative rates dependent upon the load on said driven member, of liquid-engaging means consisting of a series of vanes forming cup-like cells carried by said intermediate member, liquid-projecting means consisting of a series of vanes forming cup-like cells for projecting liquid on to said liquid-engaging means in a direction opposed to that in which the combined action of said driving member and the load reaction tends to move said liquid-engaging means, and means mounting said liquid-projecting means for relative rotation between the same and both said driving and said driven members.

2. Variable speed gearing as claimed in claim 1, wherein said mounting means is a positionally fixed supporting member, in combination with means for driving said liquid-projecting means.

3. Variable speed gearing as claimed in claim 1, wherein said mounting means comprises a positionally fixed supporting member in engagement with means for driving said liquid-projecting means in the opposite direction to that in which said intermediate member tends to move.

4. Variable speed gearing comprising a casing containing a differential gear including a driving member, an intermediate member and a driven member, a series of vanes carried by said intermediate member, and an element secured to the casing and adapted to project liquid onto said vanes in a direction opposed to that in which the said vanes tend to rotate due to the action of the driving member and load reaction.

5. Variable speed gearing comprising a casing containing a differential gear including a driving member, an intermediate member and a driven member, a series of vanes carried by said intermediate member, an element having means adapted to project liquid onto said vanes in a direction opposed to that in which the said vanes tend to rotate, a bearing member providing a stationary support on which said element is rotatably mounted, and means for rotating said liquid-projecting element on said stationary support.

6. Variable speed gearing comprising a casing containing a differential gear including a driving member, an intermediate member and a driven member, a series of vanes carried by said intermediate member, an element rotatably mounted on a fixed support in said casing, means carried by said element adapted to project liquid onto said vanes in a direction opposed to that in which the said vanes tend to rotate and means for driving said liquid-projecting element in a direction opposite to that in which the said vanes tend to rotate.

7. Variable speed gearing comprising a casing containing a differential gear train including a driving member, an intermediate member and a driven member, an annulus rotatably mounted on a fixed support within the casing in geared relationship with the driving member, a series of inclined vanes forming cup-like cells on said annulus, a series of cup-like cells on the intermediate member having their mouths adjacent to and facing the mouths of the first mentioned series, and a liquid medium in the casing forming a hydraulic coupling between the two series of cup-like cells.

8. Variable speed gearing comprising a casing containing a differential gear train including a driving member, an intermediate member and a driven member, an annulus rotatably mounted on a fixed support within the casing and driven in the opposite direction of rotation to that of the driving member, said annulus carrying a primary vane wheel having cells formed by the vanes thereon, and a secondary vane wheel carried by the intermediate member having the mouths of its cells adjacent and facing those of the primary vane wheel, the gearing being immersed in a liquid forming a hydraulic coupling between said primary and secondary vane wheels.

9. Variable speed gearing as claimed in claim 8, the vanes of both primary and secondary vane wheels being arranged at an angle to the plane of rotation.

10. In variable speed gearing, the combination with a driving member, a driven member and an intermediate member, of liquid-engaging means consisting of a series of vanes forming cup-like cells carried by said intermediate member, liquid-projecting means consisting of a series of vanes forming cup-like cells mounted independently of the driving and driven members for projecting liquid on to said liquid-engaging means in a direction opposed to that in which the combined action of said driving member and the load reaction tends to move said liquid-engaging means, and means for varying the effect of the liquid so projected.

11. Variable speed gearing comprising a casing containing a differential gear including a driving member, an intermediate member and a driven member, a series of vanes carried by said intermediate member, an element carried by the casing adapted to project liquid onto said vanes in a direction opposed to that in which the said vanes tend to rotate due to the action of the driving member and load reaction, and means comprising adjustable sluices adapted to slide between said liquid-projecting element and said vanes for varying the effect of the liquid so projected.

12. Variable speed gearing comprising a casing containing a differential gear including a driving member, an intermediate member and a driven member, a series of vanes carried by said intermediate member, an element rotatably mounted on a positionally fixed support in said casing, means carried by said element adapted to project liquid onto said vanes in a direction opposed to that in which the said vanes tend to rotate, means for causing said liquid-projecting element to rotate on said fixed support, and means comprising adjustable sluices adapted to slide between said liquid-projecting element and said vanes for varying the effect of the liquid so projected.

ROLAND TREASURE STOCK.